(12) United States Patent
Schaapman et al.

(10) Patent No.: US 11,034,858 B2
(45) Date of Patent: *Jun. 15, 2021

(54) LIGHT-COLORED ROSIN AND ROSIN ESTER COMPOSITIONS

(71) Applicant: KRATON POLYMERS LLC, Houston, TX (US)

(72) Inventors: Mark C Schaapman, Almere (NL); Jos H. M. Lange, Almere (NL)

(73) Assignee: Kraton Polymers LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,761

(22) Filed: Nov. 19, 2019

(65) Prior Publication Data

US 2020/0199408 A1 Jun. 25, 2020

Related U.S. Application Data

(60) Provisional application No. 62/783,315, filed on Dec. 21, 2018.

(51) Int. Cl.
| | | |
|---|---|---|
| *C09F 1/04* | (2006.01) | |
| *C08L 93/04* | (2006.01) | |
| *C09D 5/33* | (2006.01) | |
| *C09D 193/04* | (2006.01) | |
| *C09J 193/04* | (2006.01) | |

(52) U.S. Cl.
CPC ............... *C09F 1/04* (2013.01); *C08L 93/04* (2013.01); *C09D 5/004* (2013.01); *C09D 193/04* (2013.01); *C09J 193/04* (2013.01)

(58) Field of Classification Search
CPC ......... C09F 1/04; C08L 93/04; C09D 193/04; C09J 193/04
See application file for complete search history.

(56) References Cited

U.S. PATENT DOCUMENTS

| | | | | |
|---|---|---|---|---|
| 4,088,618 A | * | 5/1978 | Saltzman | C08L 63/00 525/54.42 |
| 4,657,703 A | * | 4/1987 | Durkee | C08L 23/02 530/218 |
| 5,830,992 A | * | 11/1998 | Whalen | C09F 1/04 530/215 |
| 2009/0018230 A1 | * | 1/2009 | Chisholm | C09D 11/101 522/78 |
| 2016/0222259 A1 | * | 8/2016 | Lange | C09J 193/04 |
| 2019/0002733 A1 | * | 1/2019 | Schaapman | C09J 193/04 |
| 2019/0338218 A1 | * | 11/2019 | Lange | C11B 3/12 |
| 2020/0224056 A1 | * | 7/2020 | Schaapman | C08L 93/04 |

FOREIGN PATENT DOCUMENTS

| | | | | |
|---|---|---|---|---|
| JP | H0264182 A | | 3/1990 | |
| WO | 98/26020 | | 6/1998 | |
| WO | WO-2015048415 A2 | * | 4/2015 | .......... C08L 23/0853 |
| WO | WO-2019052951 A1 | * | 3/2019 | .......... C09D 11/102 |

\* cited by examiner

*Primary Examiner* — Nicholas E Hill

(57) ABSTRACT

A three-step method to prepare a light-colored rosin ester is disclosed wherein at least in one of the steps (a) and (c) a co-catalyst is applied and wherein at least in one of the steps (a) and (c) a disproportionation catalyst is applied. In the second step, a distilled rosin is obtained which is esterified with a polyol into a light-colored rosin ester. In one embodiment, the co-catalyst has a triplet formation quantum yield ($\phi_T$) of greater than 0.5 and a triplet lifetime ($\tau_T$) of greater than 0.5 microseconds. In another embodiment, the co-catalyst is selected from acridone, anthrone, 9-fluorenone, thioxanthone, xanthone, derivatives and combinations thereof.

17 Claims, No Drawings

LIGHT-COLORED ROSIN AND ROSIN ESTER COMPOSITIONS

RELATED APPLICATIONS

This application claims priority from U.S. Application No. 62/783,315, with a filing date of Dec. 21, 2018, the disclosures is incorporated herein by reference.

FIELD

The disclosure relates to heated and distilled rosins and light-colored rosin esters derived thereof.

BACKGROUND

There is an unmet need for improving the chemical purity as well as color of rosins and rosin esters for various industrial applications such as adhesives and road marking.

SUMMARY

In one aspect, a three-step method to prepare a light-colored rosin ester by applying a disproportionation catalyst and a co-catalyst is disclosed. The method for preparing the light-colored rosin ester comprises three consecutive steps of; (a) heating a rosin in a substantially inert environment to obtain a purified rosin; (b) distilling the resulting rosin composition under a reduced pressure to obtain further purified distilled rosin; and (c) reacting the distilled rosin composition with one or more polyhydric alcohols and, optionally one or more monocarboxylic acids, and optionally one or more polycarboxylic acids to obtain a light-colored rosin ester, wherein at least in one of the steps (a) and (c) a co-catalyst is applied and wherein at least in one of the steps (a) and (c) a disproportionation catalyst is applied. In one aspect, the co-catalyst has a triplet formation quantum yield ($\tau_T$) of greater than 0.5 and a triplet lifetime ($\tau_T$) of greater than 0.5 microseconds. In another aspect, the co-catalyst is selected from acridone, anthrone, 9-fluorenone, thioxanthone, xanthone, derivatives and combinations thereof. In another aspect, the co-catalyst is selected from acridone, anthrone, 9-fluorenone, thioxanthone, xanthone, derivatives and combinations thereof.

In another aspect, the co-catalyst comprises compounds represented by Formula I:

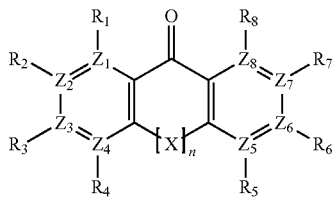

In one aspect, step (a) or step (b) are conducted in the presence of activated carbon. In another embodiment, step (a) or step (b) are conducted in the presence of activated carbon, wherein step (a) is conducted in the presence of a co-catalyst and optional presence of a disproportionation catalyst. In another embodiment, step (a) or step (b) are conducted in the presence of activated carbon, wherein step (a) is conducted in the presence of a co-catalyst and a disproportionation catalyst. Alternatively, step (a) is conducted in the presence of activated carbon and a co-catalyst and optional presence of a disproportionation catalyst. Alternatively, step (a) is conducted in the presence of activated carbon and a co-catalyst and a disproportionation catalyst. In another embodiment, the activated carbon is present in an amount of from 0.01 wt. % to 5.0 wt. %, based on the weight of rosin applied in step (a).

In another aspect, the obtained light-colored rosin ester composition in step (c) is subjected to a dehydrogenation or hydrogenation reaction in the presence of a noble metal catalyst such as Pd/C and in the presence of hydrogen.

DESCRIPTION

Unless otherwise indicated, the following definitions are applicable to this disclosure.

Acid value (or "neutralization number" or "acid number" or "acidity"): The mass of potassium hydroxide (KOH) in milligrams that is required to neutralize one gram of chemical substance. ASTM D465-05 (2010) can be used to determine acid number values.

Color (Gardner) color scale: A scale used to measure intensities of yellow color for liquid samples. Lighter (i.e., less) yellow intensity corresponds to a lower color value.

Hazen color scale: also referred to as the APHA color and the Pt/Co scale, is a color standard defined by ASTM D1209.

"Tall oil" is a viscous yellow-black liquid obtained as a co-product of the Kraft process of wood pulp manufacture when pulping mainly coniferous trees. Crude tall oil can be fractionated by distillation under a reduced pressure into tall oil head, tall oil fatty acid (TOFA), distilled tall oil (DTO), and tall oil rosin fractions, and a tall oil pitch distillation residue. TOFA mainly comprises oleic acid and linoleic acid and comprises typically 0.1-6 wt. % rosin acids.

"PAN number" refers to the sum of the percentage by mass (generally referred to as weight percentage) of palustric, abietic and neoabietic acid as obtained by hydrolysis from a rosin ester.

Disclosed herein are light-colored rosin ester compositions along with their methods of preparation. Further disclosed herein is a novel co-catalyst for obtaining a light-colored rosin ester, and methods for preparing the light-colored rosin ester by: (a) heating rosins in a substantially inert environment to produce a purified rosin; (b) distill the rosin under a reduced pressure to produce a further purified distilled rosin; and (c) reacting the distilled rosin composition with one or more polyhydric alcohols and, optionally one or more monocarboxylic acids, and optionally one or more polycarboxylic acids, wherein at least in one of the steps (a) and (c) a co-catalyst is applied, and wherein at least in one of the steps (a) and (c) a disproportionation catalyst is applied.

Component—Rosin: Rosin (or rosin acid) may include a mixture of rosin acids. Rosin acids are $C_{20}$ fused-ring monocarboxylic acids containing double bonds that vary in number and location. Examples include abietic acid, neoabietic acid, dehydroabietic acid, dihydroabietic acid, pimaric acid, levopimaric acid, sandaracopimaric acid, isopimaric acid, and palustric acid. Natural rosin typically consists of a mixture of several rosin acids in combination with minor amounts of other components.

Rosin may be commercially available, and may be obtained from pine trees by distillation of oleoresin (gum rosin), by extraction of pine stumps (wood rosin) or by fractionation of tall oil (tall oil rosin). Examples include tall oil rosin, gum rosin and wood rosin and mixtures thereof. Rosin may be subjected to one or more purification steps (e.g., distillation under reduced pressure, extraction, and/or crystallization) prior its use as a rosin in step (a) of the three-step procedure described herein. If desired, rosin may be subjected to one or more chemical modifications (e.g. hydrogenation and dehydrogenation) prior its use as a rosin in step (a).

In one embodiment, the rosin is tall oil rosin, e.g., SYLVAROS™ rosin products commercially from Kraton Chemical.

Rosin can include a mixture of rosin acids (e.g., abietadienoic acids) which may include conjugated carbon-carbon double bonds within their ring systems. These conjugated double bonds may be a source of oxidative instability. In some embodiments, the rosin ester is processed to decrease the percentage by mass (generally referred to as weight percentage) of components which include conjugated double bonds.

Distilled tall oil (DTO) comprises several monocarboxylic acids such as fatty acids and rosin acids. DTO can be used as a reactant for the preparation of rosin ester compositions. Examples include SYLVATAL™ product line by Kraton Chemical.

The rosin ester as prepared in step (c) can have a PAN number of <35, or <30, or <25, or <20, or <15, < or 10, or <5. PAN numbers are expressed as a percentage.

In further aspects, the rosin exhibits an acid number value from 110 to 190 mg KOH/gram, or 150-185 mg KOH/gram, or 170-182 mg KOH/gram. Acid number can be determined according to ASTM D465-05 (2010) and expressed as mg KOH per gram sample.

In some aspects, the rosin weight percentage (wt. %) in the reaction mixture used to prepare the rosin ester composition is in the range of from 15 wt. % to 93 wt. %, or 55-90 wt. %, or 20-60 wt. %, or 25 wt. % to 75 wt. % based on the total weight of the rosin ester.

Optional Component—Monocarboxylic acids: In an aspect, a reaction mixture for preparation of the rosin ester in step (c) comprises one or more monocarboxylic acids other than rosin. Examples include, without limitation, aromatic monofunctional carboxylic acids, heteroaromatic monofunctional carboxylic acids, aliphatic monofunctional carboxylic acids, unsaturated linear or branched monofunctional carboxylic acids, partially unsaturated linear or branched monofunctional carboxylic acids, cycloaliphatic monofunctional carboxylic acids, partly unsaturated cyclic monofunctional carboxylic acids, natural fatty acids, synthetic fatty acids, fatty acids derived from vegetable oils or animal oils, and combinations thereof. In certain cases the one or more monocarboxylic acids comprise at least one of formic acid, acetic acid, propionic acid, butyric acid, valeric acid, caproic acid, enanthic acid, caprylic acid, pelargonic acid, capric acid, lauric acid, myristic acid, palmitic acid, stearic acid, arachidic acid, behenic acid, cerotic acid, benzoic acid, phenylacetic acid, cyclopropanecarboxylic acid, cyclopentanecarboxylic acid, cyclohexanecarboxylic acid, linoleic acid, alpha-linolenic acid, elaidic acid, sapienic acid, arachidonic acid, myristoleic acid, palmitoleic acid, oleic acid, myristic acid, isostearic acid, tall oil fatty acid, and combinations thereof. In certain cases, the monocarboxylic acids comprise oleic acid, linoleic acid, alpha-linolenic acid, palmitic acid, stearic acid, and combinations thereof. In certain aspects, the one or more monocarboxylic acids comprise a tall oil fatty acid.

In some aspects, a reaction mixture for preparation of the rosin ester comprise 15-75 wt. %, or 30-70 wt. %, or 40-65 wt. %, or 20-50 wt. % of one or more monocarboxylic acids, based on the total weight of the components used to form the rosin ester.

Component—Polyhydric Alcohols: In an aspect, a reaction mixture for preparation of the rosin ester in step (c) includes at least one polyhydric alcohol. In some aspects, the polyhydric alcohol may comprise any hydrocarbon having at least 2 alcohol groups (also termed hydroxyl groups); or at least 3 alcohol groups; or at least 4 alcohol groups. The polyhydric alcohol may have an average number of hydroxyl functionalities of from 2 to 10, or 2 to 6, or 2 to 5. In some aspects, the polyhydric alcohol comprises from 2 to 30 carbon atoms, or 2 to 16 carbon atoms, or 2 to 10 carbon atoms.

Examples of polyhydric alcohols include, without limitation, ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, 1,4-butanediol, polyethylene glycol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, and lactitol. In certain cases, the one or more polyhydric alcohols may be selected from the group consisting of diethylene glycol, triethylene glycol, glycerol, trimethylolpropane, pentaerythritol, pentaerythritol technical grade, dipentaerythritol, polyglycerol, polyglycerol-4, tricyclo [5.2.1.0(2.6)]decane-4,8-dimethanol, cyclohexane-1,4-dimethanol, hydrogenated bisphenol A (4,4'-Isopropylidenedicyclohexanol) and combinations thereof.

In some aspects, the reaction mixture for preparation of the rosin ester in step (c) may comprise 6-40 wt. %, or 7-30 wt. %, or 8-22 wt. %, or 8.5-18 wt. %, or 9-13 wt. % by weight polyhydric alcohols, based on the total weight of the components used to form the rosin ester composition.

Optional Component—Polycarboxylic Acids: In embodiments, the rosin ester composition comprises one or more polycarboxylic acids. Examples include dicarboxylic acids, tricarboxylic acids, and tetracarboxylic acids. The polycarboxylic acids comprise from 2 to 54 carbon atoms. Polycarboxylic acids are selected from the group consisting of aliphatic, cycloaliphatic and aromatic polycarboxylic acids, wherein the term aromatic includes phenyl, napthyl, furyl and pyridyl groups.

Examples of polycarboxylic acids include, without limitation, adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, 1,2-cyclopentanedicarboxylic acid, 1,3-cyclopentanedicarboxylic acid, rosin dimer, isophthalic acid, terephthalic acid, phthalic acid, TOFA dimer, hydrogenated TOFA dimer, 2-(2-carboxyphenyl) benzoic acid, 2,5-furandicarboxylic acid, camphoric acid, cis-norbornene-endo-2,3-dicarboxylic acid, trimellitic acid, 2,6-naphthalenedicarboxylic acid, oxalic acid, malonic acid, glutaric acid, pimelic acid, suberic acid, azelaic acid, brassylic acid, dodecanedioic acid, thapsic acid, trimesic acid, and combinations thereof.

(Poly)carboxylic acid derivatives such as esters, anhydrides and acyl chlorides can be applied instead of (poly) carboxylic acids. For example, methyl adipoyl chloride, adipic acid dimethyl ester, adipic acid monomethyl ester, or adipoyl chloride may be used in lieu of adipic acid. Anhydrides may be used as reactants instead of the corresponding difunctional carboxylic acid. For example, succinic anhydride, may be applied instead of succinic acid. In general, these structurally related reactants contain an acyl group that may react with a nucleophile (e.g., the hydroxyl group of a polyhydric alcohol) via a nucleophilic acyl substitution mechanism.

Activated Carbon: Some of the steps are conducted in the presence of activated carbon, also called activated charcoal, which is a form of carbon processed to have small, low-volume pores that increase the surface area and which can act as an adsorbent. Activated carbon can be used in forms such as granules, powder or fibres, and specified in various ways, e.g. by their origin, activation method, apparent density, pH, particle size distribution, and iodine number. An example is Jacobi Carbons ColorSorb™ HP120N which is a chemically activated macroporous wood-based powdered carbon for moderate decolorization applications, which is washed after activation to neutralize the pH value to 4-7.

Heating Step: In embodiments, step (a) comprises heating one or more rosins in a substantially inert environment to produce a purified rosin. Without wishing to be bound by any particular theory, it is hypothesized that a rosin purification occurs during the heating step (a) wherein volatile color bodies and odor bodies are formed which either evaporate and escape in gaseous form from the mixture at the applied high temperature or can react with one or more of the chemical entities in the mixture to form less odorous or lighter-colored components. Decreased sulfur content after heating step (a) corroborates the evaporation of sulfur containing chemical entities during heating step (a).

In an example, heating of an agitated tall oil rosin (sulfur content 901 ppm) for three hours at 275° C. in a substantially inert environment (maintained by slowly purging nitrogen gas) gave a purified rosin composition having a sulfur content of 818 ppm, wherein sulfur content was determined by inductively coupled plasma with optical emission spectroscopy (ICP-OES). The time, temperature parameters of the heating stage in step (a) are inversely proportional to each other. For example, if the rosin is heated at a temperature of 240° C., a time period of 10 hours may be implemented, whereas when heating at a temperature of 300° C., a time period of 1 hour or less, such as 15 minutes is implemented. More preferred conditions for the heating cycle are from 250° C. to 295° C., and for a time of 1 to 8 hours, even more preferred from 260° C. to 290° C., and for a time of 1 to 5 hours, and most preferred from 270° C. to 280° C. for 2-4 hours.

In embodiments, the rosin is heated in a substantially inert environment, e.g., with the surrounding atmosphere is substantially free of oxygen or other reactive gas. $O_2$ has a tendency to react with rosin to yield products which impart a darker color to the rosin. Other compounds or impurities can also react with rosin to produce an inferior product. To avoid these problems, the system can be purged with an inert gas such as $N_2$ to maintain an inert environment, and to enhance rosin purification by removal of formed gaseous contaminants. Optionally, the rosin can be heated in the presence of activated carbon, during which process in certain cases the rosin can slowly decompose or decarboxylate. The type of activated carbon, addition of activated carbon during the end stage of step (a), or the use of a lower amount of activated carbon can be options to limit the degree of such a rosin decomposition or decarboxylation. For example, in the case of heating the rosin for 180 minutes, the activated carbon can be added after 150 minutes, after 160 minutes, or after 170 minutes.

Vacuum distillation Step: The rosin composition obtained from the above heating step (a) is distilled under a reduced pressure to produce a distilled rosin composition. In this step (b), the distillation under a reduced pressure is in general conducted at 0.002-100 mbar, or 0.002-25 mbar, or 0.05-25 mbar, or 0.1-25 mbar, or 0.2-13 mbar, or 0.5-5 mbar, or 0.7-3 mbar, or 1-2 mbar.

Temperature and pressure conditions of the distillation under a reduced pressure are related to each other. Reduction in pressure leads to a reduction in distillation temperature. Typically, the rosin fraction distills at 1.5 mbar between approximately 195° C. and 225° C. (vapor temperature at the top of the distillation column). The vacuum distillation can be performed by using a common distillation set up with a low bridge in the absence of a distillation column, or by means of wiped film evaporation or short path evaporation.

Rosin heating in general leads to a slight degree of rosin degradation, disproportionation, fragmentation or decarboxylation which can result in the formation of a fraction which is more volatile than rosin. The use of a distillation column such as a random packed column filled with small objects like Raschig rings, or a column with structured packing, or a vigreux or spinning band column will increase the number of stages and will allow the collection of separate distillation fractions, such as a rosin fraction and a fraction comprising more volatile components. In one example, one main distillation fraction of 85-95 wt. % is in general collected with a low distillation bridge, comprising mainly rosin and a minor amount of more volatile chemical entities. Usually, the bottoms cut (residue) is from 5-15% by weight of the charge. The volatile fraction can be collected at 1.5 mbar between about 100 and 160° C. as a separate (first) fraction, and usually its yield is from 1-15% by weight of the charge, prior to collection of the (second) main rosin fraction between approximately 195° C. and 225° C.

Component—Catalysts and Additives: In some embodiments, a three-step method to prepare a light-colored rosin ester by applying a disproportionation catalyst and a co-catalyst is disclosed, wherein at least in one of the steps (a) and (c), a co-catalyst is applied, and wherein at least in one of the steps (a) and (c), a disproportionation catalyst is applied. In another aspect, the reaction mixture in step (a) comprises a co-catalyst. In another aspect, the reaction mixture in step (a) comprises a disproportionation catalyst and a co-catalyst. In another aspect, the reaction mixture in step (a) comprises a disproportionation catalyst. In another aspect, the reaction mixture in step (a) comprises no catalyst. In another aspect, the reaction mixture optionally comprises an esterification catalyst in step (c) of the three-step method. In another aspect, the reaction mixture in step (c) comprises a rosin and neither disproportionation catalyst nor co-catalyst. In another aspect, the reaction mixture in step (c) comprises a rosin, a disproportionation catalyst and a co-catalyst. In another aspect, the reaction mixture in step (c) comprises a rosin and a co-catalyst. In another aspect, the reaction mixture in step (c) comprises a rosin and a disproportionation catalyst. In yet another aspect, a reaction mixture in step (c) comprises a rosin, an esterification catalyst, a disproportionation catalyst, and a co-catalyst.

Rosin disproportionation mainly converts abietadienoic acids such as palustric acid, abietic acid and neoabietic acid into dehydroabietic acid and dihydroabietic acids. Methods of disproportionation may involve heating rosin, in general in the presence of one or more disproportionation agents or catalysts. Examples of disproportionation agents include but are not limited to, thiobisnaphthols, including 2,2'-thiobis-phenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis(6-t-butyl-o-cresol) thiobisnaphthols, 2,2'-thio-bisphenols, 3,3'-thio-bis phenols; metals, including palladium, nickel, platinum and palladium on charcoal (Pd/C), iodine or iodides (e.g., iron iodide); sulfides (e.g., iron sulfide); and combinations thereof. In certain aspects, the rosin is disproportionated using a phenol sulfide type disproportionation agent such as poly-t-butylphenoldisulfide, 4,4'thiobis(2-t-butyl-5-methylphenol), nonylphenol disulfide oligomers and amylphenol disulfide polymer.

Suitable esterification catalysts include Lewis acids and Brønsted-Lowry acids. Examples include acidic catalysts such as acetic acid, p-toluenesulfonic acid, methanesulfonic acid, hypophosphorous acid, boric acid, and sulfuric acid; phosphite esters such as triphenylphosphite, alkaline metal hydroxides such as calcium hydroxide; cation exchange resins, $SiO_2$-supported and $Al_2O_3$-supported metal oxides, metal oxides, such as calcium oxide, magnesium oxide, zinc oxide and aluminum oxide; and other metal salts, such as iron chloride, calcium formate, and calcium phosphonates (e.g., calcium bis-monoethyl (3,5-di-tert-butyl-4-hydroxybenzyl) phosphonate, Irganox® 1425).

Co-catalyst: In the preparation of a light-colored rosin ester, at least one of the reaction mixtures of steps (a) and (c) comprises one or more co-catalysts. Although the term co-catalyst is used, it should be noted that the co-catalyst can be used in one of the steps (a) and (c) in the absence of a disproportionation catalyst, and without the presence of an esterification catalyst in step (c). In one embodiment, the co-catalyst is represented by Formula I:

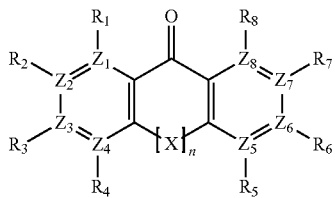

wherein n=0 or n=1 or n=2; X represents oxygen, sulphur, nitrogen, or carbon; $Z_1$, $Z_2$, $Z_3$, $Z_4$, $Z_5$, $Z_6$, $Z_7$ and $Z_8$ are the same or different and each represents carbon or nitrogen; $R_1$, $R_2$, $R_3$, $R_4$, $R_5$, $R_6$, $R_7$ and $R_8$ are the same or different and each independently can be hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a carboxyalkyl group, a glucopyranosyl group or a glucopyranosyloxy group. $Z_x$, wherein x has a value of 1-8, will be unsubstituted if $Z_x$ represents a nitrogen atom in accordance with the chemistry standard rules of valence wherein a nitrogen atom has three attached bonds X represents an oxygen, sulphur, nitrogen, or carbon atom, which atoms are substituted according to the chemistry valence rules with one or more substituents and which additional substituents are selected from hydrogen, oxygen, hydroxyl, alkyl, alkenyl, alkynyl, cycloalkyl, cycloalkylalkyl, aryl, heteroaryl, aralkyl, oxiranylalkyl, carboxyalkyl, carboxyalkyl, hydroxyalkyl, halogen substituted benzyl, alkyl substituted benzyl, alkoxy substituted benzyl, halogen substituted aryl, alkyl substituted aryl, and alkoxy substituted aryl, or atom X is covalently connected to atom $Z_5$ in formula (I) to lead to a five-membered or six-membered ring in the case that X represents a nitrogen atom or carbon atom. Examples of such compounds of general structure (I) are 10-alkyl-9(10H)-Acridinone and 9H-Thioxanthen-9-one, 10,10-dioxide. In one aspect, when n=2, the structure of Formula I has two X groups which may be the same or different. In such instances, both X groups may be a carbon, or one X group may be a carbon and the second X group may be a nitrogen, oxygen or sulfur.

In one embodiment, two of the substituents $R_1$, $R_2$, $R_3$, $R_4$, $R_5$, $R_6$, $R_7$ and $R_8$ adjacent to each other may form together with the carbon atom to which they are bonded a ring. $R_4$ and $R_5$ are considered as adjacent positions in the case that n=0. The ring could be cycloaliphatic, aromatic or heteroaromatic and optionally contain one or more substituents wherein the substituents are the same or different and are selected from hydrogen, methyl, ethyl, hydroxy, methoxy, cyano, amino, chloro and fluoro. The ring is optionally substituted with an additional fused or isolated cycloaliphatic, aromatic or heteroaromatic ring. An example wherein two of the substituents $R_1$, $R_2$, $R_3$, $R_4$, $R_5$, $R_6$, $R_7$ and $R_8$ adjacent to each other form together with the carbon atom to which they are bonded a ring is 4H-Cyclopenta[lmn]phenanthridine-5,9-dione. Other examples are 4H-Cyclopenta[def]phenanthren-4-one and 7H-Benzo[c]fluoren-7-one.

Several compounds of Formula (I) are occurring in nature. For example, a number of xanthones have been isolated from natural sources of higher plants, fungi, ferns, and lichens. These naturally occurring compounds can have various substitution patterns $R_1$, $R_2$, $R_3$, $R_4$, $R_5$, $R_6$, $R_7$ and $R_8$ and can occur as optically active stereoisomers. These naturally occurring compounds of general structure (1) can be commercially available. Naturally occurring compounds of general structure (1) are part of the present invention. Examples of such naturally occurring compounds of general structure (1) are 4-β-D-glucopyranosyl-1,3,6,7-tetrahydroxy-9H-Xanthen-9-one (CAS No. 24699-16-9, isomangiferin), 3a, 12c-dihydro-8-hydroxy-6-methoxy-(3aR, 12cS)-7H-Furo[3',2':4,5]furo[2,3-c]xanthen-7-one (CAS No. 10048-13-2, Sterigmatocystin) and 1,3,6-trihydroxy-7-methoxy-2,8-bis(3-methyl-2-buten-1-yl)-9H-Xanthen-9-one (CAS No. 6147-11-1, mangostin).

Alternatively, the co-catalyst may comprise a precursor of any of the compounds characterized by Formula I and its associated functional groups as described herein. Alternatively, the co-catalyst can comprise the product of a chemical reduction or the product of a chemical oxidation of any of the compounds characterized by Formula I and its associated functional groups as described herein. Alternatively, the co-catalyst can comprise the product of a chemical reduction or the product of a chemical oxidation of a precursor of any of the compounds characterized by Formula I and its associated functional groups as described herein.

In yet another aspect, examples of co-catalysts include thioxanthones, anthrones, xanthones, acridones, fluorenones, and any dimer, oligomer or polymeric derivative thereof, any complex thereof, any precursor thereof, any salt thereof, any stereoisomer thereof, any tautomer thereof or any combination thereof. Examples of co-catalyst compounds includes anthrone, xanthone, 1-azaxanthone, acridone, 10-methyl-9(10H)-acridone, 9-fluorenone, thioxanthone, 2-isopropylthioxanthone, 4-isopropylthioxanthone, 2-chlorothioxanthone, 1-chloro-4-propoxythioxanthone, 2,4-diethylthioxanthone, 2,4-dimethylthioxanthone and 2,4-diisopropylthioxanthone.

In one embodiment, the co-catalyst comprises anthrone, xanthone, thioxanthone, acridone or 9-fluorenone, the structures of which are depicted below. The co-catalyst may also comprise derivatives of anthrone, xanthone, thioxanthone, acridone or 9-fluorenone according to Formula I.

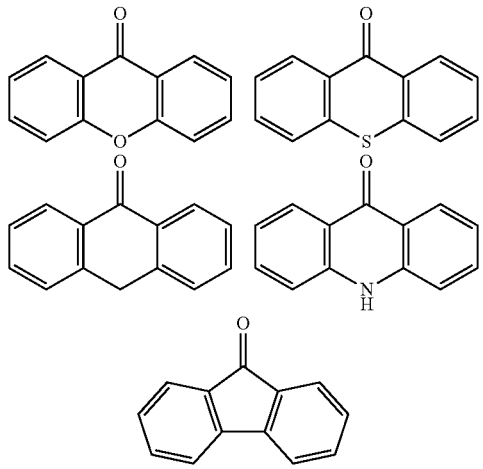

In some aspects, the esterification catalyst is present in an amount ranging from 0.001 wt. % to 5.0 wt. %, alternatively from 0.01 wt. % to 1.0 wt. %, or alternatively from 0.05 wt. % to 0.5 wt. %, based on the total weight of rosin and monocarboxylic acid in step (c).

In some aspects, the disproportionation catalyst is present in an amount ranging from 0.001 wt. % to 5.0 wt. %, alternatively from 0.001 wt. % to 3.0 wt. %, alternatively from 0.01 wt. % to 1.0 wt. %, or alternatively from 0.03 wt. % to 0.8 wt. %, alternatively from 0.1 wt. % to 0.5 wt. %, alternatively from 0.2 wt. % to 0.40 wt. %, based on the total weight of chemical substances applied in steps (a) and (c). For example, in step (a) 99.6 g rosin, 0.1 g co-catalyst and 0.3 g disproportionation catalyst are applied. In step (c) 0.2 g disproportionation catalyst is applied and the weight of all applied chemical substances in step (c) amounts to 150 g. The resulting wt. % of disproportionation catalyst is (0.3+0.2)/(100+150)=0.2%.

In one embodiment, the co-catalyst is present in an amount of 0.001 wt. % to 5.0 wt. %, or 0.01 wt. % to 1.0 wt. %, or 0.05 wt. % to 0.5 wt. %, based on the total weight of chemical substances applied in steps (a) and (c). In one embodiment, the co-catalyst is any material able to catalyze the reactions disclosed herein and compatible with the other components of the mixture.

In an aspect, the co-catalyst suitable has a high triplet formation quantum yield (designated $\phi_T$). The energy of the co-catalyst singlet ($E_S$) and the triplet ($E_T$) state is indicated in kJ/mol. The energy difference $E_S$–$E_T$ is expressed as $E_A$ (kJ/mol). The co-catalyst has a triplet formation quantum yield ($\phi_T$) expressed as formation factor and a triplet lifetime ($\tau_T$) expressed in microseconds (μs). In an aspect, the co-catalyst has a $\phi_T$ of greater than 0.5, alternatively greater than 0.7 or alternatively greater than 0.8. In an aspect, the co-catalyst has a triplet lifetime of greater than 0.5 μs, alternatively greater than 1.0 μs or alternatively greater than 5.0 μs. In an aspect, the co-catalyst has an $E_S$ of greater than 200 kJ/mol; alternatively greater than 225 kJ/mol or alternatively greater than 250 kJ/mol. In an aspect, a suitable co-catalyst has a $E_A$ of less than 100 kJ/mol, alternatively less than 75 kJ/mol or less than 50 kJ/mol. Values for co-catalysts of the type disclosed herein is presented in Table 1:

TABLE 1

| Compound | $E_S$ (KJ/mol)* | $E_T$ (KJ/mol)* | $E_A$ (KJ/mol) | $\phi_T$ | $\tau_T$ (μs) |
|---|---|---|---|---|---|
| Acridone | 304 | 244 | 60 | 0.99 | 20 |
| Xanthone | 324 | 310 | 14 | | 20 |
| Anthraquinone | 284 | 261 | 23 | 0.9 | 0.11 |

*Values based on non-polar solvent

Preparation of Rosin Ester: In an aspect, a reaction mixture to prepare the light color rosin ester in step (c) comprises: (i) one or more distilled rosins obtained in step (b), (ii) one or more monocarboxylic acids, (iii) one or more polyhydric alcohols; and (iv) one or more polycarboxylic acids. Ratio of the weight of one or more polycarboxylic acids to the rosin and the one or more monocarboxylic acids can be less than 1:20, or <1:50, or <1:100. In some cases, the ratio of the weight of the rosin to one or more monocarboxylic acids ranges from 60:40 to 10:85. The ratio of the weight of the rosin and the one or more monocarboxylic acids to the weight of one or more polycarboxylic acids can be at least 6.5:1, or at least 15:1. The values provided are for the amount (e.g., wt. %) of a component or reactant used in the preparation of light-colored rosin ester compositions. In some cases, the polycarboxylic acids are present in an amount of less than 6 wt. % based on the total weight of the reactants applied in step (c) to prepare the light-colored rosin ester, or <5 wt. %, or <4 wt. %, or <2 wt. %.

The rosin ester can be prepared by esterification, transesterification or interesterification reactions utilizing the reactants, catalysts and co-catalysts disclosed herein. Suitable reaction conditions may be selected in view: a) the nature of the reactants (e.g., the chemical and physical properties of the rosin); b) the identity of the one or more monocarboxylic acids; c) the identity of the one or more polycarboxylic acids; d) the identity of the one or more polyhydric alcohols; e) the identity of the one or more catalysts; and f) the desired chemical and physical properties of the resultant rosin ester and combinations thereof.

In one embodiment, step (c) comprises esterifying a reaction mixture comprising one or more distilled rosins obtained in step (b), optionally one or more monocarboxylic acids, and optionally one or more polycarboxylic acids with one or more polyhydric alcohols using an esterification catalyst. The method can optionally include a disproportionation agent and co-catalyst. The method can be a thermal reaction at an elevated temperature. In one embodiment, the rosin ester is prepared by subjecting the mixture to a temperature from 200° C. to 320° C., or 240° C. to 300° C., or 265° C. to 290° C. The esterification reaction duration is in general 3 to 18 hours, or 4 to 15 hours, or 5 to 10 hours. The esterifying step can further comprise removing water formed as a byproduct to drive the reactions to completion, using standard methods, such as distillation and/or application of a vacuum.

In some aspects, the rosin ester can be prepared by an esterification process in a substantially inert environment such as in a nitrogen gas flow. Optionally, the esterifying step may further comprise removing water formed as a byproduct of the esterification reaction. In some aspects, the esterifying step may comprise contacting reactants in the reaction mixture with an esterification catalyst (e.g., calcium-bis((3,5-bis(1,1-dimethylethyl)-4-hydroxyphenyl) methyl)-ethylphosphonate)).

The rosin ester can also be prepared by a transesterification process, wherein esters of the carboxylic acid-containing components are reacted with one or more polyhydric alcohols. In the case of polyhydric alcohols that have reacted with carboxylic acids, some free unreacted polyhydric alcohol hydroxyl groups may remain which may react in a transesterification reaction with esters and result in an exchange of their alkoxy groups. Such a transesterification reaction is an equilibrium reaction wherein new rosin ester may be formed. Accordingly, in some aspects, the method may comprise reacting one or more rosin esters having a hydroxyl value>0 with one or more esters derived from monocarboxylic acids and optionally one or more polycarboxylic acids. In some aspects, an alcohol or a polyhydric alcohol may be added to trigger or accelerate such a transesterification reaction. In some aspects, the transesterication step may comprise contacting the mixture and the one or more polyhydric alcohols with an esterification catalyst.

The rosin ester can also be prepared by an inter-esterification process, which is mechanistically related to esterification and transesterification. Inter-esterification may be carried out by blending different esters and then rearranging the carboxylic acid moieties over the applied polyhydric alcohol backbones in the presence of a catalyst, for example an esterification catalyst. Inter-esterifications are equilibrium reactions. By way of an example, a rosin ester may be reacted with a triglyceride ester, such as rapeseed oil. Such an inter-esterification reaction would afford a rosin ester wherein the fatty acid moieties in the triglyceride ester are partly substituted by rosin acid moieties, and wherein the rosin acid moieties in the rosin ester are partly substituted by fatty acid moieties.

Optionally, step (c) may include varying the relative amount of reactants in order to influence the hydroxyl number and acid number of the resultant rosin ester. For example, a stoichiometric excess of carboxylic acid functionality versus polyhydric alcohol functionality will in general lead to rosin esters having a low hydroxyl number. From a chemistry perspective, it means that more moles of carboxylic acid moieties (carboxyl moieties), as compared to the number of moles of total polyhydric alcohol hydroxyl moieties, may be applied. In some aspects, the reactant mixture prior to the start of the synthesis may contain a stoichiometric molar ratio of total hydroxyl functionality to total carboxyl functionality of <1.40, e.g., 1.10 or less, or <1.05, or <1.00, or <0.95, or <0.90, or from 1.00 to 1.15, or from 0.85 to 1.05.

In one embodiment, step (c) of the three step method comprises contacting a distilled rosin as obtained in step (b), a polyhydric alcohol and a co-catalyst, to form a reaction mixture and heating the reaction mixture at a temperature in the range of from 240° C. to 300° C. for 3 to 18 hours to produce a light-colored rosin ester. In another embodiment, the method comprises contacting a distilled rosin as obtained in step (b), a co-catalyst and a disproportionation catalyst to form a reaction mixture and heating the reaction mixture to a temperature of from 240° C. to 300° C. for 3 to 18 hours. In yet another embodiment, the distilled rosin as obtained in step (b) is brought into contact with one or more additional catalysts and reagents (e.g., an esterification catalyst, a polyol, etc.) and heated from 240° C. to 300° C. for 3 to 18 hours in order to produce light-colored rosin ester compositions.

In embodiments, the method can further include one or more additional processing steps subsequent to step (c) such as a hydrogenation or dehydrogenation reaction. In some aspects, the rosin ester obtained in step (c) of the three-step method, may be further processed, for example, to remove contaminants contributing to odor or color, to further decrease the PAN number; to influence the hydroxyl number; to influence the acid number; and combinations thereof. Where chemically permissible, such methods may be performed subsequent to step (c) to obtain a modified light-colored rosin ester and/or a hydrogenated or dehydrogenated rosin ester having the desired chemical and physical properties, as discussed in more detail below.

In some aspects, methods may further comprise hydrogenating the light colored rosin ester obtained in step (c), e.g., contacting the rosin ester with a hydrogenation catalyst and hydrogen gas for a period of time and under suitable conditions to form a hydrogenated or partially hydrogenated rosin ester. Examples of heterogeneous hydrogenation catalyst include noble metal catalysts (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). In some cases, the hydrogenation catalyst may be present in an amount ranging from 0.1 wt. % to 5 wt. %, based on the total weight of the crude rosin ester.

The hydrogenation reaction can be at an elevated temperature, an elevated pressure, and combinations thereof, e.g., from 120° C. to 300° C. temperature, a pressure ranging from 30 to 2000 pounds per square inch (psi), or alternatively from 100 to 1000 psi.

In some aspects, methods may further comprise dehydrogenating the light-colored rosin ester obtained in step (c), e.g., contacting the rosin ester with a noble metal catalyst and hydrogen for a period of time and under suitable conditions to form a dehydrogenated rosin ester wherein certain impurities are reduced or hydrogenated. In general, applied pressure and/or temperature and the amount of hydrogen in a rosin ester dehydrogenation will be lower than in a rosin ester hydrogenation process.

In some aspects, following esterification, transesterification or inter-esterification, the resultant light-colored rosin ester can comprise low amounts of residual materials, such as unreacted rosin, decarboxylated rosin acid, and/or unreacted or partly reacted polyhydric alcohol. After removal of volatiles, a rosin ester which is characterized by a low acid number may be characterized by a relatively low weight fraction of lower molecular weight species and may be suitable for applications where low migration and/or low volatile organic compound content is beneficial. Examples may comprise food contact applications, adhesives and low-fogging systems.

In some aspects, the acid number of the rosin ester may be reduced by removing excess and/or unreacted rosin (e.g., rosin acids) following the esterification, but prior to any subsequent processing. For example, following esterification, unreacted rosin and other volatile components, may be removed using any suitable methodology such as steam stripping under a reduced pressure or by inert gas sparging such as with nitrogen.

Properties of the Rosin Ester Product: The light-colored rosin ester obtained in step (c) is characterized as having a neat Gardner color (as determined according to ASTM D1544-04 (2010)) of less than 3, or alternatively of less than 2, or alternatively of less than 1.

In some aspects, the hydroxyl number of the light-colored rosin ester is <50 mg/KOH/g, or <40 mg/KOH/g, or <30 mg/KOH/g, or <20 mg/KOH/g, or <10 mg/KOH/g, or <6 mg/KOH/g, or <3 mg/KOH/g. In some aspects, the acid number of the light-colored rosin ester is <40 mg/KOH/g, or <30 mg/KOH/g, or <20 mg/KOH/g, or <15 mg/KOH/g, or <10 mg/KOH/g, or <5 mg/KOH/g.

In some aspects, the light-colored rosin ester exhibits color stability upon thermal aging, a change of 5.0 or less Gardner color units when heated to a temperature of 177° C. for a period of 96 hours (e.g., 3.0 or less, or 1.0 or less). In some embodiments, the rosin ester exhibit a change of 0 to 5.0, 0.1 to 5.0, 0.2 to 5, 0.3 to 5.0, 0.5 to 5.0, 1.0 to 5.0, 2.5 to 5.0, 3.0 to 5.0, 3.5 to 5.0, 4.0 to 5.0 or 4.5 to 5.0 Gardner color units.

In some aspects, the light-colored rosin ester has a glass transition temperature (Tg) of between −80° C. and 100° C., or between −30° C. and 80° C., or between 0° C. and 70° C. as determined by means of Differential scanning calorimetry (DSC).

In embodiments, the light-colored rosin ester has a softening point between 0-150° C., or between 50-130° C., or between 70-120° C. measured using the Ring-and-Ball method. In embodiments, the rosin ester may be a liquid (e.g., a viscous liquid) at 20° C. and 1 atm.

In one embodiment, the light-colored rosin ester is characterized as having residual amounts of the co-catalyst in amounts of 1 ppm to 200 ppm, or from 5 ppm to 150 ppm, or 0.0005 wt. % to 0.015 wt. %.

In embodiments, the amount of residual co-catalyst ranges from >0.00001% to less than 100% of the amount of co-catalyst used initially for the reaction to prepare the rosin ester.

In one embodiment, the light-colored rosin ester composition produced has a neat Gardner color of <3, has an acid number value<30 mg KOH/gram, a PAN value of <30%, and a hydroxyl number of <30 mg KOH/g.

Applications: The light-colored rosin ester compositions may be used in a variety of applications, including adhesives (e.g., hot-melt adhesives), tackifiers in hot-melt and pressure-sensitive adhesives, adhesive dispersions such as adhesive aqueous dispersions, modifiers for rubbers and various plastics, emulsifiers for synthetic rubbers, base materials for chewing gum, resins in coating compositions, inks, sizing agents for paper making, asphalt markings, pavement markings, road surface markings, inks, coatings, rubbers (e.g., tires and tire treads), sealants and plasticizers. The light-colored rosin ester can also be used in a variety of additional applications, including as a softener and plasticizer in chewing gum bases, as a weighting and clouding agent in beverages, as a surfactant, surface activity modulator, or dispersing agent, an additive in waxes and wax-based polishes, modifier in skin products and cosmetic formulations (e.g., mascara), in the electrical industry as insulators, as drying oils in making paints and other wood treatment products, in treating the hulls of wooden boats, in soaps, in candles, as a lubricant in automotive applications and engine lubricants, to make biodiesel, to produce biodegradable hydraulic fluids, in metal working and other industrial applications, as a phase change material, or a curing agent in concrete.

Other examples include road surface markings such as reflective markers, thermoplastic road surface markings, preformed thermoplastic pavement markings and preformed polymer tape. Thermoplastic binder systems are generally based on rosin esters of the type disclosed herein and also include plasticizers, glass beads (or other optics), pigments, and fillers. The light-colored rosin ester possesses brighter, more vivid shades of color for improvements to road surface marking applications. In one embodiment, the rosin ester is used in a road marking formulation, which may include 5-25 wt. %, or 10-20 wt. % of the light-colored rosin ester, based on the total weight of the road marking formulation. The road marking formulation may further include a polymer (e.g., a polymer derived from one or more ethylenically-unsaturated monomers), e.g., 0.1-1.5 wt. % of the thermoplastic road surface marking formulation. The formulation may further include a pigment (e.g., 1-10 wt. % titanium dioxide), and glass beads (e.g., 25-50 wt. %), and a filler (e.g., calcium carbonate which may make up the balance of the composition up to 100 wt. %). The formulation may further include an oil (e.g., 1-5% wt. % mineral oil), a wax (e.g., 1-5 wt. % paraffin-based wax or synthetic Fischer-Tropsch wax), a stabilizer (e.g., 0.1-0.5 wt. % stearic acid), and, optionally, additional polymers and/or binders other the rosin ester.

In some embodiments, the light-colored rosin ester is used in a hot-melt adhesive. The polymer in the adhesives may be any suitable polymer. The polymer may be, for example, a polyacrylate, a polyolefin, a polyamide, a polyvinyl ether, a polyurethane, a polyester, a polyvinyl ester, a copolymer thereof, or a blend thereof. In some cases, the polymer can be derived from one or more ethylenically-unsaturated monomers. In some aspects, the polymer can comprise any of: a copolymer of ethylene and n-butyl acrylate; a copolymer of styrene and one or more of isoprene and butadiene; a block copolymer of styrene and one or more of isoprene and butadiene; a hydrogenated block copolymer of styrene and one or more of isoprene and butadiene wherein one or more of isoprene and butadiene are hydrogenated or partly hydrogenated; a polymer derived from one or more ethylenically-unsaturated monomers; a polymer derived from vinyl acetate. The hot-melt adhesive may include one or more additional components, including tackifiers, waxes, stabilizers (e.g., antioxidants), templating agents, pigments and dyestuffs, plasticizers, fillers, and one or more waxes such as a Fischer-Tropsch wax or a paraffin wax.

In an aspect, an adhesive composition may include the light-colored rosin ester in an amount of from 15 wt. % to 60 wt. %, or 25-45 wt. % based on the total adhesive composition. A hot-melt adhesive composition may include 15-60 wt. %, alternatively of from 25-45 wt. % of the light-colored rosin ester based on the total amount of the composition. A pressure-sensitive adhesive may include the light-colored rosin ester in amounts of 5-60 wt. %, from 25-45 wt. % based on the total weight of the pressure-sensitive adhesive composition.

Examples: The examples are not intended to limit the specification or the claims.

Hydroxyl numbers were determined according to DIN 53240-2. Acid numbers were determined according to ASTM D465-05 (2010). Softening points were determined according to ASTM E28-99 (2009). PAN numbers were determined according to ASTM D5974-00 (2010). Gardner scale color (neat, measured according to ASTM D1544-04 (2010)) and Hazen color (ASTM D1209) were determined with Dr Lange LICO 200 colorimeter. Glass transition temperatures ($T_g$) were determined by DSC.

Rosin ester preparations: SYLVAROS™ 90 tall oil rosin (color 7.3 G, AN 175.8 mg KOH/g) was used in examples 1-8. SYLVAROS™ 90 (5.4 G, AN 177.2 mg KOH/g) was used in examples 9 and 10. AO (Irganox™ 565, 0.08 wt. % based on applied rosin charge in the esterification reaction) was added and mixed for 15 min at 180° C. at the end of the rosin ester preparations in Examples 1-10. Glycerol (99%, Merck), pentaerythritol (99%), 9-fluorenone (98%, Sigma-Aldrich), xanthone (99%, Alfa Aesar), Rosinox™ (poly-tert-butylphenoldisulfide, Arkema Inc.), stearic acid (reagent grade 95%, Sigma-Aldrich), adipic acid (99%, Acros Organics), 1,4-cyclohexanedimethanol (99%, mixture of cis and trans, Sigma-Aldrich), and Irganox™ 1425 (BASF) were applied. Vacuum distillation equipment: Edwards RV5 two stage rotary vane pump and Vacuubrand CVC 3000 vacuum controller. In examples 1-9, vacuum distillations were conducted by using a low distillation bridge of 4 cm height. In example 10, a vigreux distillation column, (42 cm height, 30 cm effective height) was applied. Abbreviations: AN; acid number, OH; hydroxyl number, $N_2$; nitrogen gas, SP; Softening point, AO; Antioxidant, g; gram, min; minute, h; hour, G; Gardner (neat), rpm; revolutions per min.

Example 1, Comparative: SYLVAROS™ 90 (220.99 g) was charged into a four-necked flask (0.5 L) and heated to 180° C. in a $N_2$ atmosphere. After the rosin was completely melted, the resulting solution was mechanically stirred (stirring speed 300 rpm). Glycerol (19.38 g), Irganox™ 1425 (0.771 g) and Rosinox™ (0.773 g) were added. The reaction mixture was heated to 275° C. (30° C./h) and subsequently held at 275° C. for 7 h while allowing the formed water to escape as vapor. Residual volatiles were stripped off during 1 h of $N_2$ sparging at 275° C. The resulting reaction mixture was cooled to 180° C. AO (Irganox™ 565) was added and the resulting mixture was stirred for 15 min to give a rosin ester (4.0 G, AN 9.4 mg KOH/g, OH 4.6 mg KOH/g, PAN 26.6%, $T_g$ 38° C., SP 85° C.).

Example 2, Comparative: SYLVAROS™ 90 (350.15 g) was distilled under a reduced pressure (1.5 mbar) to give a distilled rosin (color 6.1 G, AN 188.1 mg KOH/g) which was collected between 130-220° C. (distillation temperature of the distillate), wherein most of the distillate was collected between 185-200° C. 285.92 g of the distilled rosin was reacted with glycerol (26.83 g) in the presence of Irganox™ 1425 (0.995 g) and Rosinox™ (1.01 g) in the same manner as example 1 to give a rosin ester (3.2 G, AN 8.0 mg KOH/g, OH 0 mg KOH/g, PAN 25.9%, $T_g$ 41° C., SP 85° C.).

Example 3, Comparative: SYLVAROS™ 90 (217.32 g) was stirred (300 rpm) and heated in a $N_2$ atmosphere at 280° C. for 2 h to give a purified rosin composition, followed by a vacuum distillation (1.5 mbar) of the obtained purified rosin in the same manner as example 2 to give a distilled rosin (4.0 G, AN 177.3 mg KOH/g). 165.92 g of the obtained distilled rosin was reacted with glycerol (15.18 g) in the presence of Irganox™ 1425 (0.573 g) and Rosinox™ (0.587 g) in the same manner as example 1 to give a rosin ester (3.1 G, AN 8.6 mg KOH/g, OH 0.0 mg KOH/g, PAN 25.0%, $T_g$ 40° C., SP 85° C.).

Example 4: SYLVAROS™ 90 (230.38 g) was heated and subsequently distilled under a reduced pressure (1.4 mbar) in the same manner as example 3 to give a distilled rosin (4.0 G, AN 177.3 mg KOH/g). 177.62 g of the obtained distilled rosin was reacted with glycerol (15.55 g) at 275° C. for 7 h in the presence of Rosinox™ (0.621 g), Irganox™ 1425 (0.626 g), and 9-fluorenone (0.361 g) in the same manner as example 1, to give a light-colored rosin ester (2.2 G, AN 9.1 mg KOH/g, OH 0.0 mg KOH/g, PAN 26.5%, $T_g$ 40° C., SP 86° C.).

Example 5: SYLVAROS™ 90 (305.52 g) was heated in the presence of 9-fluorenone (0.617 g), and subsequently distilled under a reduced pressure (1.7 mbar) in the same manner as example 3 to give a distilled rosin (AN 176.3 mg KOH/g). 245.1 g of the distilled rosin was reacted with glycerol (21.21 g), in the presence of Rosinox™ (0.86 g) and Irganox™ 1425 (0.86 g), in the same manner as example 1, to give a light-colored rosin ester (1.9 G, AN 19.4 mg KOH/g, OH 0.2 mg KOH/g, PAN 24.1%, $T_g$ 37° C., SP 83° C.

Example 6: SYLVAROS™ 90 (311.43 g) was heated in the presence of Rosinox™ (0.106 g) and 9-fluorenone (0.62 g), and subsequently distilled under a reduced pressure (1.0 mbar) in the same manner as example 3 to give a distilled rosin (3.1 G, AN 172.5 mg KOH/g). 220.46 g of the distilled rosin was reacted with glycerol (18.73 g) in the presence of Irganox™ 1425 (0.773 g) and Rosinox™ (0.772 g), in the same manner as example 1, by applying 1 h of $N_2$ sparging instead of 2 h, to give a light-colored rosin ester (2.2 G, AN 12.3 mg KOH/g, OH 0.1 mg KOH/g, PAN 22.6%, $T_g$ 39° C., SP 85° C.).

Example 7: SYLVAROS™ 90 (292.41 g) was heated at 275° C. for 3 h in the presence of Rosinox™ (1.026 g) and 9-fluorenone (0.579 g), and subsequently distilled under a reduced pressure (1.7 mbar) in the same manner as example 3 to give a distilled rosin (1.3 G, AN 161.5 mg KOH/g). The amount of distillation residue was 35.75 g. 244.31 g of the distilled rosin was reacted with pentaerythritol (21.33 g) in the presence of Irganox™ 1425 (0.84 g), xanthone (0.736 g) and Rosinox™ (0.865 g) in the same manner as example 1 at 275° C. for 8 h instead of 7 h, and by applying 2 h of $N_2$ sparging instead of 1 h, to give a light-colored rosin ester (0.7 G, AN 4.7 mg KOH/g, OH 0.0 mg KOH/g, PAN 8.7%, $T_g$ 53° C., SP 100° C.).

Example 8: SYLVAROS™ 90 (243.78 g) was heated at 275° C. for 3 h in the presence of Rosinox™ (0.852 g) and xanthone (0.475 g), and subsequently distilled under a reduced pressure (1.5 mbar) in the same manner as example 3 to give a distilled rosin (179.6 g, 1.2 G, AN 153.8 mg KOH/g) and 25.98 g distillation residue. 176.24 g of the distilled rosin was reacted with pentaerythritol (14.58 g) in the presence of Irganox™ 1425 (0.63 g), in the same manner as example 1 at 275° C. for 8 h instead of 7 h, and by applying 2 h of $N_2$ sparging instead of 1 h, to give a light-colored rosin ester (2.5 G, AN 1.9 mg KOH/g, OH 0.0 mg KOH/g, PAN 16.2%, $T_g$ 57° C., SP 101° C.).

Example 9: SYLVAROS™ 90 (271.12 g) was stirred (150 rpm) and heated at 275° C. in a $N_2$ atmosphere for 3 h in the presence of Rosinox™ (0.81 g) and xanthone (0.28 g). 260.63 g of the obtained purified rosin was subsequently distilled under a reduced pressure (1.1 mbar) in the same manner as example 3 to give a distilled rosin (228.1 g, 0.9 G, 195 Hazen, AN 158.9 mg KOH/g) and 23.3 g distillation residue. 220.08 g of the distilled rosin was reacted with pentaerythritol (18.70 g), SYLFAT™ FA2 tall oil fatty acid (80.0 g, color 3 G, AN 196 mg KOH/g) and adipic acid (6.04 g) in the presence of Irganox™ 1425 (0.763 g), xanthone (0.44 g) and Rosinox™ (0.22 g) in the same manner as example 1, at 275° C. for 8 h instead of 7 h, with the modification that the mixture was first heated from 170° C. to 210° C. (15° C./h), and from 210° C. to 275° C. (30° C./h), and by applying 2 h of $N_2$ sparging instead of 1 h, to give a light-colored rosin ester (1.8 G, AN 8.8 mg KOH/g, OH 0.0 mg KOH/g, PAN 9.3%, $T_g$ −21° C.).

Example 10: SYLVAROS™ 90 (257.43 g) was stirred (150 rpm) and heated at 275° C. in a $N_2$ atmosphere for 3 h in the presence of activated carbon (7.77 g, ColorSorb™ HP120N, Jacobi Carbons) and xanthone (0.505 g). The obtained purified rosin was subsequently distilled under a reduced pressure (1.0-2.0 mbar) with a vigreux distillation column to give a distilled rosin fraction (0.5 G, 128 Hazen, AN 173.1 mg KOH/g). 60.87 g of the distilled rosin was reacted with 1,4-cyclohexanedimethanol (24.65 g) and stearic acid (55.8 g) in the presence of Irganox™ 1425 (0.429 g), xanthone (0.345 g) and Rosinox™ (0.467 g) in the same manner as example 9, to give a light-colored rosin ester (104.37 g, 1.4 G, AN 1.0 mg KOH/g).

While various aspects of the present disclosures have been shown and described, modifications thereof can be made by one skilled in the art without departing from the spirit and teachings of the disclosure. The aspects of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. The claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

The invention claimed is:

1. A rosin ester prepared by reacting a rosin composition with one or more polyhydric alcohols and, optionally one or more monocarboxylic acids, and optionally one or more polycarboxylic acids in the presence of 0.001 wt. % to 5.0 wt. % of a co-catalyst and 0.001 wt. % to 5.0 wt. % of a disproportionation catalyst, wherein the co-catalyst comprises a compound represented by the formula:

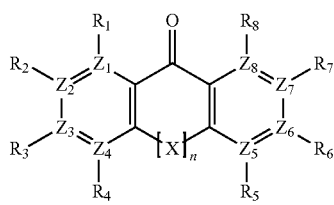

wherein n=0, 1 or 2;
X represents oxygen, sulphur, nitrogen, or carbon;
$Z_1$, $Z_2$, $Z_3$, $Z_4$, $Z_5$, $Z_6$, $Z_7$ and $Z_8$ are the same or different and each represents carbon or nitrogen;
$R_1$, $R_2$, $R_3$, $R_4$, $R_5$, $R_6$, $R_7$ and $R_8$ are the same or different and each is independently selected from the group of hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a carboxyalkyl group, a glucopyranosyl group, and a glucopyranosyloxy group,
wherein the rosin ester has a neat Gardner color of less than 3, an acid number value less than 30 mg KOH/gram, a PAN value less than 30%, and a hydroxyl number less than 30 mg KOH/g; and
wherein the rosin ester contains a residual amount of co-catalyst ranging from >0.00001% to <100% of the co-catalyst used initially for the reaction.

2. The rosin ester of claim 1, wherein the reaction further comprises 0.001 wt. % to 5.0 wt. % of a disproportionation catalyst, and wherein the disproportionation catalyst is selected from the group of 2,2'thiobisphenols, 3,3'-thiobisphenols, 4,4'-thiobis(resorcinol), 1,1'-thiobis(pyrogallol), 4,4'-thiobis(6-t-butyl-m-cresol), 4,4'-thiobis(6-t-butyl-o-cresol), thiobisnaphthols, 2,2'-thio-bisphenols, 3,3'-thio-bis phenols, palladium, nickel, platinum, Pd/C, iodine, iodides, sulfides, poly-t-butylphenoldisulfide, 4,4'thiobis(2-t-butyl-5-methylphenol, nonylphenol disulfide oligomers, amylphenol disulfide polymer, and combinations thereof.

3. A method for preparing a rosin ester comprising:
a) heating a rosin in a substantially inert environment;
b) distilling the resulting rosin composition under a reduced pressure; and
c) reacting the distilled rosin composition with one or more polyhydric alcohols and, optionally one or more monocarboxylic acids, and optionally one or more polycarboxylic acids,
wherein at least in one of the steps (a) and (c) a co-catalyst and a disproportionation catalyst are applied, and wherein the co-catalyst comprises a compound represented by the formula:

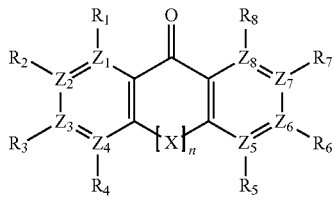

wherein n=0, 1 or 2;
X represents oxygen, sulphur, nitrogen, or carbon;
$Z_1$, $Z_2$, $Z_3$, $Z_4$, $Z_5$, $Z_6$, $Z_7$ and $Z_8$ are the same or different and each represents carbon or nitrogen;
$R_1$, $R_2$, $R_3$, $R_4$, $R_5$, $R_6$, $R_7$ and $R_8$ are the same or different and each is independently selected from the group of hydrogen, an alkyl group, an aryl group, an arylalkyl, an alkenyl group, an arylalkenyl group, an alkynyl group, an arylalkynyl group, a cycloalkyl group, a cycloalkylalkyl group, an alkylene group, a cycloalkylalkylene group, an alkynylene group, a phenyl group, a tolyl group, a naphtyl group, a pyridyl group, a furyl group, an acyl group, a propionyl group, a formyl group, a benzoyl group, a acetoxy group, a halogen, an alkoxy group, an amino group, a benzyl, halogen substituted benzyl group, a alkyl substituted benzyl group, a alkoxy substituted benzyl group, a halogen substituted aryl group, an alkyl substituted aryl group, an alkoxy substituted aryl group, a dialkylamino group, a monoalkylamino group, a monoalkylamido group, a dialkylamido group, a cyano group, a hydroxymethyl group, a hydroxyalkyl group, a trifluoromethyl group, a trifluoromethoxy group, a trifluoromethylthio group, a trifluoromethylsulfonyl group, a nitro group, a carboxyl group, a hydroxyl group, an alkoxyalkyl group, an aryloxyalkyl group, a sulfamoyl group, a dimethylsulfamido group, a sulfhydryl group, an alkylsulfonyl group, an arylsulfonyl group, an alkylsulfinyl group, an arylsulfinyl group, an alkylsulfanyl group, an arylsulfanyl group, a methoxycarbonyl group, an ethoxycarbonyl group, an isopropoxycarbonyl group, a carbamoyl group, a carbonyl chloride group, a phosphine group, a phosphate group, a phosphodiester group, a phosphonic acid group, an oxiranylalkyl group, a carboxyalkyl group, a carboxyalkyl group, a glucopyranosyl group, and a glucopyranosyloxy group,
wherein the disproportionation catalyst is present in an amount of from 0.001 wt. % to 5.0 wt. %, based on the total weight of chemical substances applied in steps (a) and (c);
wherein the co-catalyst is present in an amount of from 0.001 wt. % to 5.0 wt. %, based on the total weight of chemical substances applied in steps (a) and (c) and wherein the co-catalyst has a triplet formation quantum yield ($\phi T$) of greater than 0.5 and a triplet lifetime ($\tau T$) of greater than 0.5 microseconds; and
wherein the rosin ester contains a residual amount of the co-catalyst ranging from >0.00001% to <100% of the co-catalyst used in the at least one of the steps (a) and (c).

4. The method of claim 3, wherein the co-catalyst comprises at least one of acridone, anthrone, 9-fluorenone, thioxanthone, xanthone, derivatives, and combinations thereof.

5. The method of claim 3, wherein the disproportionation catalyst is selected from the group of 2,2'thiobisphenols, 3,3'-thiobisphenols, 4,4'-thiobis(resorcinol), 1,1'-thiobis(pyrogallol), 4,4'-thiobis(6-t-butyl-m-cresol), 4,4'-thiobis(6-t-butyl-o-cresol), thiobisnaphthols, 2,2'-thio-bisphenols, 3,3'-thio-bis phenols, palladium, nickel, platinum, Pd/C, iodine, iodides, sulfides, poly-t-butylphenoldisulfide, 4,4'thiobis(2-t-butyl-5-methylphenol, nonylphenol disulfide oligomers, amylphenol disulfide polymer, and combinations thereof.

6. The method of claim 3, wherein the rosin in step (a) comprises a tall oil rosin, a gum rosin, a wood rosin, a hydrogenated rosin, a dehydrogenated rosin, a rosin purified by distillation or crystallization, and combinations thereof.

7. The method of claim 3, wherein the one or more polyhydric alcohols has an average hydroxyl functionality from 2 to 10 and wherein the polyhydric alcohol comprises from 2 to 30 carbon atoms.

8. The method of claim 3, wherein the one or more polyhydric alcohols comprise at least one of glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyethylene glycol, polyglycerol, polyglycerol technical grade, polyglycerol-3, polyglycerol-4, 1,4-butanediol, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, lactitol, and combinations thereof, and
wherein the amount of one or more polyhydric alcohols is 6 wt. % to 40 wt. % based on the total weight of the reactants in step (c).

9. The method of claim 3, wherein the one or more monocarboxylic acids comprise at least one of formic acid, acetic acid, propionic acid, butyric acid, valeric acid, caproic acid, enanthic acid, caprylic acid, pelargonic acid, capric acid, lauric acid, myristic acid, palmitic acid, stearic acid, arachidic acid, behenic acid, cerotic acid, benzoic acid, phenylacetic acid, cyclopropanecarboxylic acid, cyclopentanecarboxylic acid, cyclohexanecarboxylic acid, linoleic acid, alpha-linolenic acid, elaidic acid, sapienic acid, arachidonic acid, myristoleic acid, palmitoleic acid, oleic acid, myristic acid, isostearic acid, tall oil fatty acid, and combinations thereof, wherein the one or more monocarboxylic acids are present in an amount of from about 15 wt. % to about 75 wt. % based on the total weight of the reactants in step (c).

10. The method of claim 3, wherein the one or more polycarboxylic acids comprise at least one of adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, 1,2-cyclopentanedicarboxylic acid, 1,3-cyclopentanedicarboxylic acid, rosin dimer, isophthalic acid, terephthalic acid, phthalic acid, TOFA dimer, hydrogenated TOFA dimer, 2-(2-carboxyphenyl) benzoic acid, 2,5-furandicarboxylic acid, camphoric acid, cis-norbornene-endo-2,3-dicarboxylic acid, trimellitic acid, 2,6-naphthalenedicarboxylic acid, oxalic acid, malonic acid, glutaric acid, pimelic acid, suberic acid, azelaic acid, brassylic acid, dodecanedioic acid, thapsic acid, trimesic acid, and combinations thereof, and wherein the polycarboxylic acids are present in an amount of less than 6 wt. % based on the total weight of the reactants applied in step (c).

11. The method of claim 3, wherein
heating of the rosin in step (a) is conducted at 240° C. to 300° C. for 15 minutes to 10 hours,
distilling the resulting rosin composition in step (b) is under a pressure from 0.002-25 mbar, and
the rosin esterification in step (c) is conducted at 240° C. to 300° C. for 3 to 18 hours.

12. The method of claim 3, further comprising contacting the mixture in step (c) with an esterification catalyst, wherein the esterification catalyst is selected from the group of acetic acid, p-toluenesulfonic acid, methanesulfonic acid, hypophosphorous acid, sulfuric acid, boric acid, phosphite esters, triphenylphosphite, alkaline metal hydroxides, calcium hydroxide, metal oxides, $SiO_2$-supported and $Al_2O_3$-supported metal oxides, cation exchange resins, calcium oxide, magnesium oxide, zinc oxide, aluminum oxide, calcium bis-monoethyl (3,5-di-tert-butyl-4-hydroxybenzyl) phosphonate and combinations thereof.

13. The method of claim 3, further comprising contacting the mixture in step (a) or (b) with an activated carbon wherein the activated carbon is present in an amount of from 0.01 wt. % to 5.0 wt. %, based on the weight of rosin applied in step (a).

14. The methods of claim 3, wherein the co-catalyst and the disproportionation catalyst are applied in step (a).

15. A rosin ester produced by the method of claim 3.

16. An adhesive composition comprising the rosin ester of claim 3.

17. A road marking composition comprising the rosin ester of claim 3.

* * * * *